United States Patent
Sunkara et al.

(10) Patent No.: US 10,235,975 B2
(45) Date of Patent: Mar. 19, 2019

(54) METHOD AND SYSTEM FOR PROVIDING A REAL TIME CONTENT UPDATES TO A USER

(71) Applicant: Samsung Electronics Co., Ltd., Gyeonggi-do (KR)

(72) Inventors: Sowmya Sunkara, Guntur (IN); Ravitheja Tetali, Visakhapatnam (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 14/559,714

(22) Filed: Dec. 3, 2014

(65) Prior Publication Data

US 2015/0161970 A1  Jun. 11, 2015

(30) Foreign Application Priority Data

Dec. 3, 2013  (IN) ........................... 5568/CHE/2013
Aug. 6, 2014  (IN) ........................... 5568/CHE/2013

(51) Int. Cl.
*G09G 5/38* (2006.01)
*G06F 3/14* (2006.01)
*G06F 3/00* (2006.01)
*G09G 5/14* (2006.01)

(52) U.S. Cl.
CPC ................. *G09G 5/38* (2013.01); *G06F 3/00* (2013.01); *G06F 3/14* (2013.01); *G09G 5/14* (2013.01); *G09G 2330/021* (2013.01); *G09G 2340/10* (2013.01); *G09G 2340/12* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,215,474 B1* | 4/2001 | Shah ................... | H04M 1/0214 345/156 |
| 2005/0151871 A1* | 7/2005 | Minami ................. | H04H 60/47 348/333.01 |
| 2008/0176606 A1* | 7/2008 | Kim ................... | G06F 17/30994 455/566 |
| 2010/0035657 A1* | 2/2010 | Blenessy ........... | G06F 17/30905 455/566 |
| 2010/0079442 A1* | 4/2010 | Yang ..................... | G06F 1/1694 345/214 |

(Continued)

OTHER PUBLICATIONS

Office Action dated Jul. 23, 2018 in connection with India Patent Application No. 5568/CHE/2013, 6 pages.

*Primary Examiner* — Saptarshi Mazumder

(57) ABSTRACT

Embodiments herein provide a method and system for constantly rendering a dynamic content of an item displayed in an electronic device. Further, the method includes identifying the dynamic content associated with a region of the item. Further, the method includes generating an overlay including a transparent region and an opaque region. The overlay is sized in accordance to a display coordinates associated with the object. Further, the method includes rendering the identified dynamic content of the item in the transparent region of the overlay on the electronic device. Furthermore, the transparent region is configured to adaptively display the identified dynamic content in the display coordinates of the object.

20 Claims, 13 Drawing Sheets

(56) References Cited

U.S. PATENT DOCUMENTS

| | | | |
|---|---|---|---|
| 2010/0138775 A1* | 6/2010 | Kohen | G06F 9/4443 |
| | | | 715/781 |
| 2010/0205520 A1* | 8/2010 | Parish | G06F 17/246 |
| | | | 715/212 |
| 2010/0240421 A1* | 9/2010 | Sekora | H04B 1/3838 |
| | | | 455/575.1 |
| 2010/0269030 A1 | 10/2010 | Dugonjic et al. | |
| 2011/0060998 A1* | 3/2011 | Schwartz | G06F 17/30873 |
| | | | 715/738 |
| 2011/0083102 A1* | 4/2011 | Adachi | G06F 3/0481 |
| | | | 715/800 |
| 2011/0199314 A1* | 8/2011 | Laberge | G06F 3/0481 |
| | | | 345/173 |
| 2012/0204113 A1* | 8/2012 | Shiplacoff | G06F 3/0482 |
| | | | 715/733 |

* cited by examiner

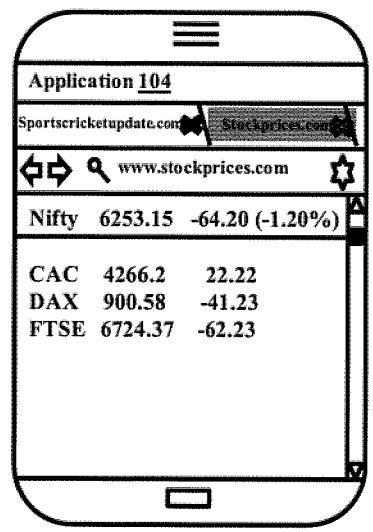
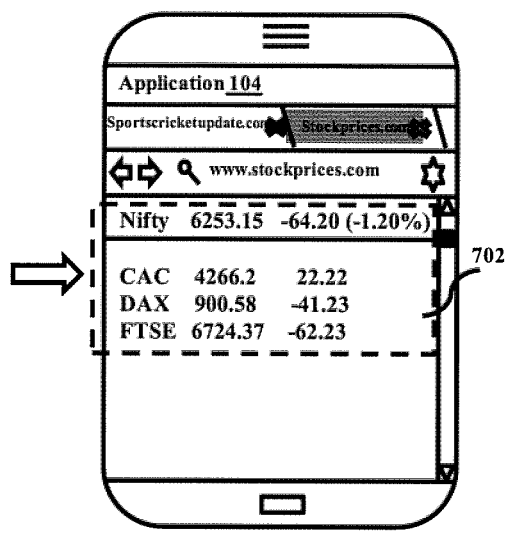
FIG. 7E                FIG. 7F
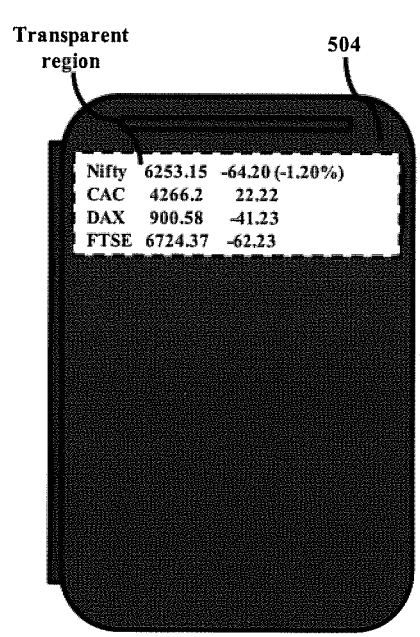
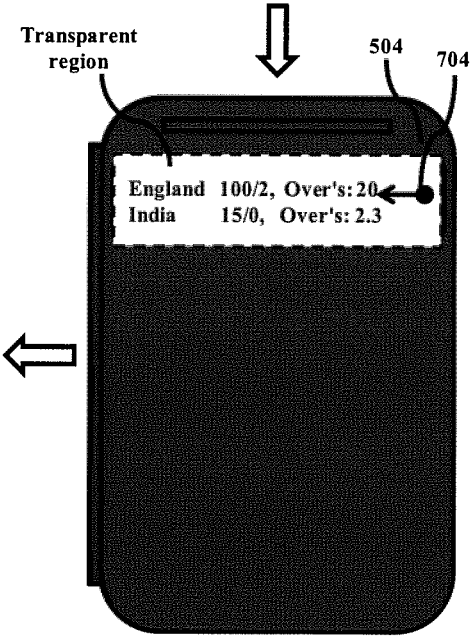
FIG. 7H                FIG. 7G

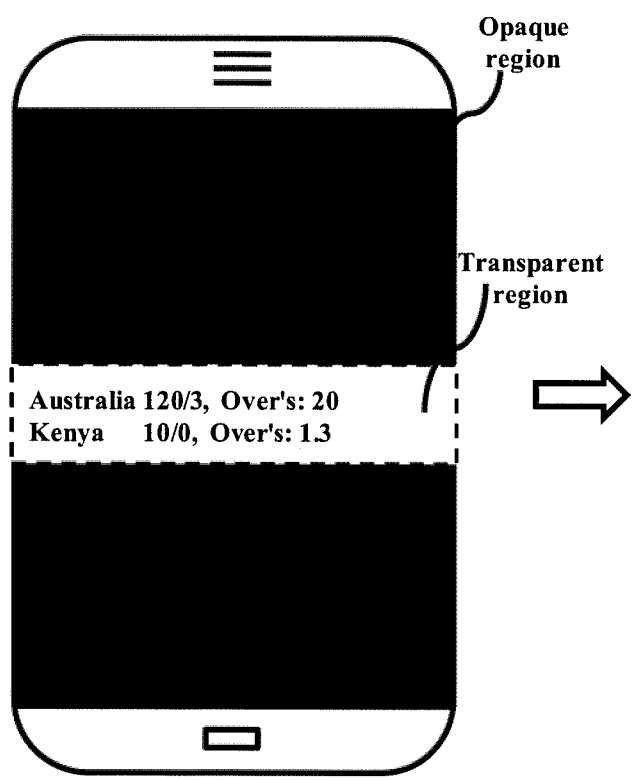
FIG. 8E
FIG. 8F

METHOD AND SYSTEM FOR PROVIDING A REAL TIME CONTENT UPDATES TO A USER

CROSS-REFERENCE TO RELATED APPLICATION(S) AND CLAIM OF PRIORITY

The present application is related to and claims the benefit under 35 U.S.C. § 119(a) of an Indian Provisional patent application filed on Dec. 3, 2013 in the India Intellectual Property Office and assigned Serial number 5568/CHE/2013 and an Indian Non-Provisional patent application filed on Aug. 6, 2014 in the India Intellectual Property Office and assigned Serial number 5568/CHE/2013, the entire disclosure of which is hereby incorporated by reference.

TECHNICAL FIELD

The present disclosure generally relates to rendering a dynamic content to a user and more particularly to render the dynamic content of an item displayed in an electronic device.

BACKGROUND

Generally, users access different set of web-pages to view the content associated with the web-page on an electronic device. In a web-page, users might have specific regions of interest and might seek to keep themselves constantly updated by the dynamic content of that portion of the web-page. Users might want to be constantly notified by these updates.

Currently, the electronic device state (for example: locked state, user switches-off the electronic device, or the user closes the flip cover) changes depending on the various usage scenarios. The screen of the electronic device gets locked after a certain time, or the user closes the flip-cover. In such cases, to receive browser updates, there are several user-actions involved in which the user unlocks the electronic device or opens the flip-cover to unlock the screen. Further, the user opens the browser, views a tab and scrolls to the region of the webpage that is of interest which increases the number of user actions and time to view the content which is of user interest.

Thus, there is a need in the art to provide the real time dynamic content updates irrespective of the device state which minimizes the number of user actions required, reduces the power consumption of the electronic device, and also reducing the computation time of the browser application.

The above information is presented as background information only to help the reader to understand the present disclosure. Applicants have made no determination and make no assertion as to whether any of the above might be applicable as Prior Art with regard to the present application.

SUMMARY

To address the above-discussed deficiencies, it is a primary object to provide a method and system to constantly render a dynamic content of an item displayed in an electronic device.

Aspect of the present disclosure is to provide a method and system to constantly render a dynamic content of an item displayed in an electronic device on a secondary electronic device In a first example, a method for constantly rendering at least one dynamic content of at least one item displayed in an electronic device is provided. The method includes identifying the at least one dynamic content associated with at least one region of the at least one item. The method also includes generating an overlay including a transparent region and an opaque region. The overlay is sized in accordance to a display coordinates associated with at least one object. The method further includes rendering the at least one identified dynamic content of the at least one item in the transparent region of the overlay on the electronic device. The transparent region is configured to adaptively display the at least one identified dynamic content in the display coordinates of the at least one object.

In a second example, an electronic device for constantly rendering at least one dynamic content of at least one item displayed in an electronic device is provided. The electronic device includes an integrated circuit. The integrated circuit includes at least one processor and at least one memory. The at least one memory includes a computer program code within the integrated circuit. At least one memory and the computer program code with the at least one processor cause the electronic device to identify the at least one dynamic content associated with at least one region of the at least one item. Further the electronic device is configured to generate an overlay including a transparent region and an opaque region. The overlay is sized in accordance to a display coordinates associated with at least one object. Furthermore, the electronic device is configured to render the at least one identified dynamic content of the at least one item in the transparent region of the overlay on the electronic device. The transparent region is configured to adaptively display the at least one identified dynamic content in the display coordinates of the at least one object.

In a third example, a computer program product comprising a computer executable program code recorded on a computer readable non-transitory storage medium is provided. The computer executable program code when executed cause the actions including identifying at least one dynamic content associated with at least one region of at least one item. The computer executable program code when executed cause further actions including generating an overlay including a transparent region and an opaque region. The overlay is sized in accordance to a display coordinates associated with at least one object. The computer executable program code when executed cause further actions rendering the at least one identified dynamic content of the at least one item in the transparent region of the overlay on an electronic device. The transparent region is configured to adaptively display the at least one identified dynamic content in the display coordinates of the at least one object.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications is made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A-7H show example illustrations for selecting multiple regions and rendering the multiple regions of a webpage displayed in a see-through portion of a flip cover associated with an electronic device, according to this disclosure;

FIGS. 8A-8F show example illustrations for selecting and rendering a specific region of a webpage displayed in a secondary electronic device, according to this disclosure.

DETAILED DESCRIPTION

Figure 1:
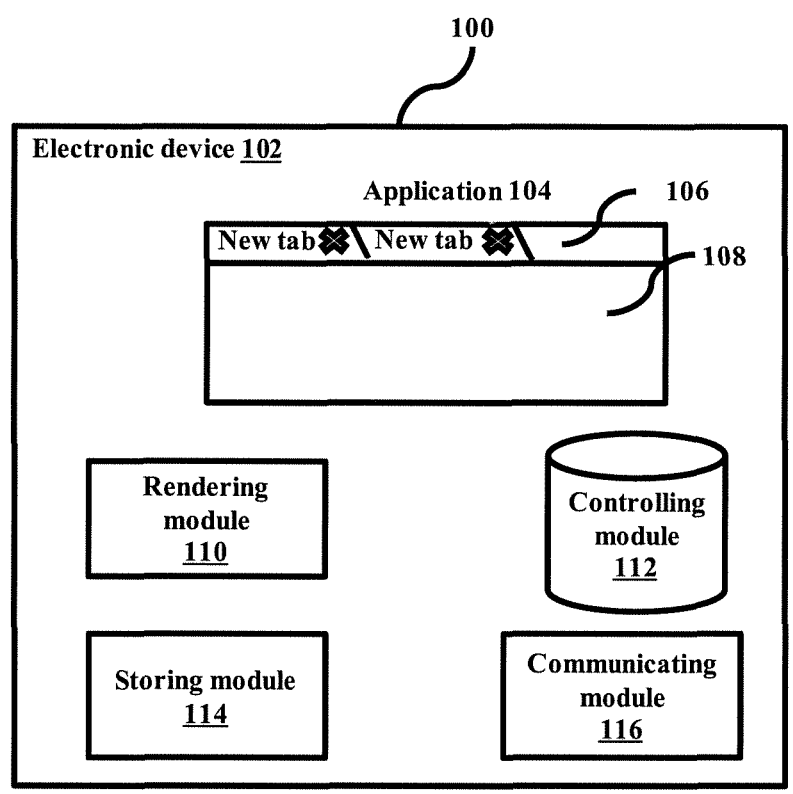
FIG. 1 illustrate an overview of an example system for constantly rendering a dynamic content of an item displayed in an electronic device, according to this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein is practiced and to further enable those of skill in the art to practice the embodiments herein. Accordingly, the examples should not be construed as limiting the scope of the embodiments herein.

Prior to describing the present disclosure in detail, it is useful to provide definitions for key terms and concepts used herein. Unless defined otherwise, all technical and scientific terms used herein have the same meaning as commonly understood by a personal having ordinary skill in the art to which this disclosure belongs.

Item: Refers to a webpage, a portion of a webpage, a display window, an undisplayed portion of said webpage, a window within a webpage, an application or the like.

Object: A material thing to which a specified action is performed.

The embodiments herein disclose a method and system for constantly rendering a dynamic content of an item displayed in an electronic device. The method includes identifying the dynamic content associated with a region of the item. Further, the method includes generating an overlay including a transparent region and an opaque region. The overlay is sized in accordance to a display coordinates associated with the object. Further, the method includes rendering the identified dynamic content of the item in the transparent region of the overlay on the electronic device. The transparent region is configured to adaptively display the identified dynamic content in the display coordinates of the object. Unlike conventional systems, no need to create separate widgets or applications to view the dynamic content which is of user interest. Unlike conventional systems, the user receives the dynamic content updates of a selected region on the webpage in the lock screen or in a see-through portion when the flip cover of the electronic device is in a closed state. Unlike conventional systems, the user receives the dynamic content updates by performing minimum number of user actions; thereby, eliminating the steps to be performed by the user such as opening the flip cover, unlocking the electronic device screen (might require a pattern/password to unlock the screen), accessing the browser to view a tab, and scroll to the region of the webpage that is of interest.

In an embodiment, the dynamic content is displayed in a secondary electronic device. The method includes identifying an event in the secondary electronic device. Further, the method includes determining the display coordinates associated with the secondary electronic device after identifying the event. The method includes rendering the identified dynamic content of the item in the transparent region of the overlay on the secondary electronic device. The overlay is sized in accordance to the display coordinates associated with the secondary electronic device. Unlike conventional systems, the user is provided with the real-time dynamic content updates on the secondary electronic device (For example: Wearable device, Dashboard in a car, T.V, consumer electronic device (such as washing machine), and the like) which is in sync with the electronic device irrespective of the electronic device state (such as whether the electronic device is in locked state or the screen is closed with the flip cover of the electronic device). In an embodiment, the electronic device is a Smart phone, a Personal Digital Assistant (PDA), a tablet, a phablet, and the like)

In an embodiment, the method includes frequently monitoring the identified dynamic content of the item in the transparent region of the overlay on the object. Further, the method includes determining whether an update associated with the identified dynamic content in response to detecting the change in the dynamic content. Further, the method includes dynamically updating the identified dynamic content in the transparent region of the overlay displayed on the object in response to determining that the update is associated with the identified dynamic content.

Referring now to the drawings, and more particularly to FIGS. 1 through 9, where similar reference characters denote corresponding features consistently throughout the figures, there are shown preferred embodiments.

FIG. 1 illustrate an overview of an example system 100 for constantly rendering a dynamic content of an item displayed in an electronic device 102, according to this disclosure. In an embodiment, the electronic device 102 is, for example and not limited to, a mobile phone, a smart phone, a Personal Digital Assistants (PDAs), a tablet, a phablet, or any other electronic device. The electronic device 102 includes an application 104, a rendering module 110, a controlling module 112, a storing module 114, and a communicating module 116.

The application 104 described herein is a web browser application. The application 104 includes an address bar 106, where a user enters a Uniform Resource Locator (URL) into the address bar 106. Further, the application 104 includes a webpage 108 displayed to the user which is pertaining to the entered URL into the address bar 106. For example, the URL is a "www.sports-cricketupdate.com". The URL "www.sports-cricketupdate.com" is entered into the address bar 106 to display the cricket related web site 108 to the user. In another example, the URL "www.stockprices.com" is entered into the address bar 106 to display the dynamic updates of the stock prices to the user where there is the real time update of the stock prices.

In an embodiment, the rendering module 110 is configured to identify the dynamic content associated with the region of the item. Further, the rendering module 110 is configured to generate an overlay including a transparent region and an opaque region. Further, the rendering module 110 is configured to render the identified dynamic content of the item in the transparent region of the overlay on the electronic device 102.

In an embodiment, the controlling module 112 is configured to compute the display coordinates associated with the object of the electronic device 102. The display coordinates include aspect ratio of the object. Further, the controlling module 112 is configured to sizing the transparent region of the overlay in accordance to the display coordinates of the object. Further, the controlling module 112 is configured to shift the transparent region of the overlay to the display coordinates of the object (for example, a see through window). Further, the controlling module 112 is configured to frequently monitor the identified dynamic content of the item in the transparent region of the overlay on the object. Further, the controlling module 112 is configured to dynamically update the identified dynamic content in the transparent region of the overlay displayed on the object.

In an embodiment, the storing module 114 is configured to store display coordinates of the object, display coordinates of a secondary electronic device, and control instructions to perform various operation in the system 100.

In an embodiment, the communicating module 116 is configured to receive an event notification performed on the secondary electronic device (such as a wearable device, Dashboard in a vehicle, infotainment system in the vehicle, television, consumer electronic device (such as washing machine), and any other electronic device). Further, the communicating module 116 is configured to send the identified dynamic content in the transparent region of the overlay to be displayed on the screen of the secondary electronic device.

Figure 2:
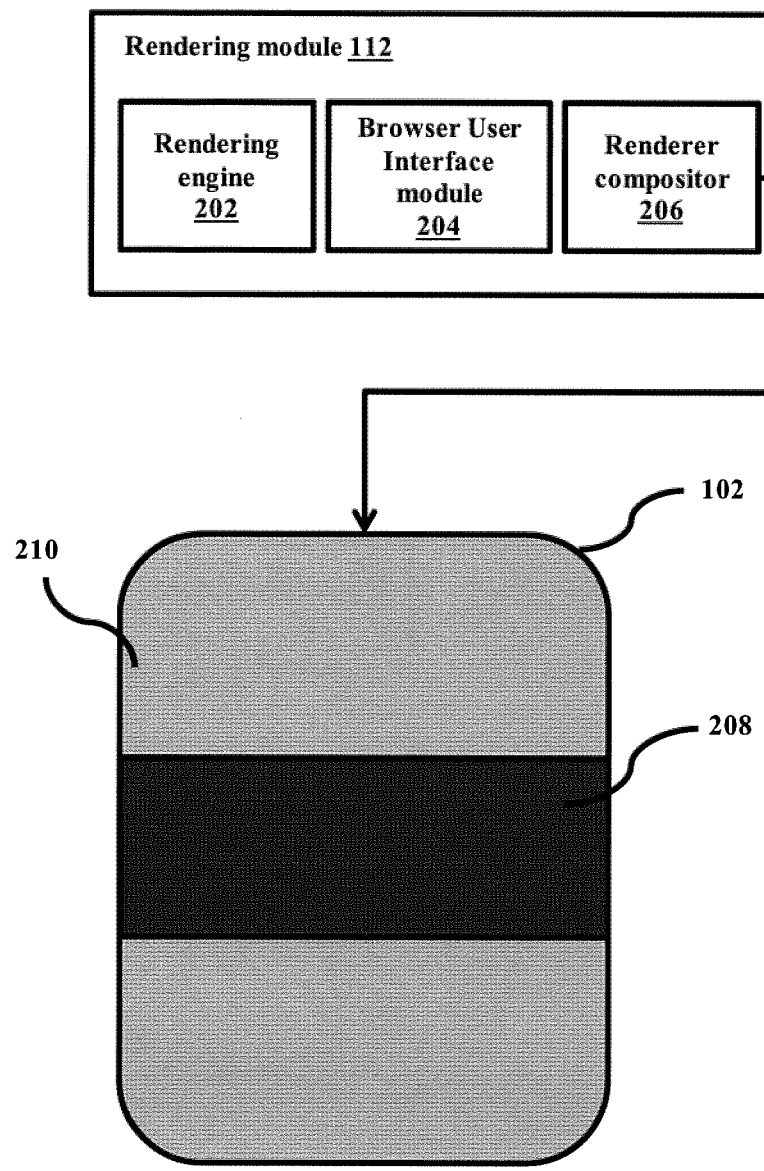
FIG. 2 illustrates example sub-modules of a rendering module shown in FIG. 1 which creates a transparent region and an opaque region in the electronic device, according to this disclosure.

FIG. 2 illustrates example sub-modules of a rendering module 110 shown in FIG. 1 which creates a transparent region and an opaque region in the electronic device 102, according to this disclosure. The rendering module 110 is configured to include a rendering engine 202, browser user interface (UI) module 204, and a renderer compositor 206. The electronic device 102 includes a transparent region 208, and an opaque region 210.

In an embodiment, the rendering engine 202 is configured to identify the dynamic content associated with the region of the item. In an embodiment, the browser UI module 204 is configured to generate an overlay including a transparent region and an opaque region. The transparent region includes the identified dynamic content associated with the region of the item. Further, the browser UI module 204 is configured to render only the transparent region of a webpage.

In an embodiment, the renderer compositor 206 is configured to make the background texture as black (such as opaque region 210) and displays only the transparent region on the electronic device 102; thereby, reducing the application power consumption, and computing time by the electronic device 102.

Figure 3:
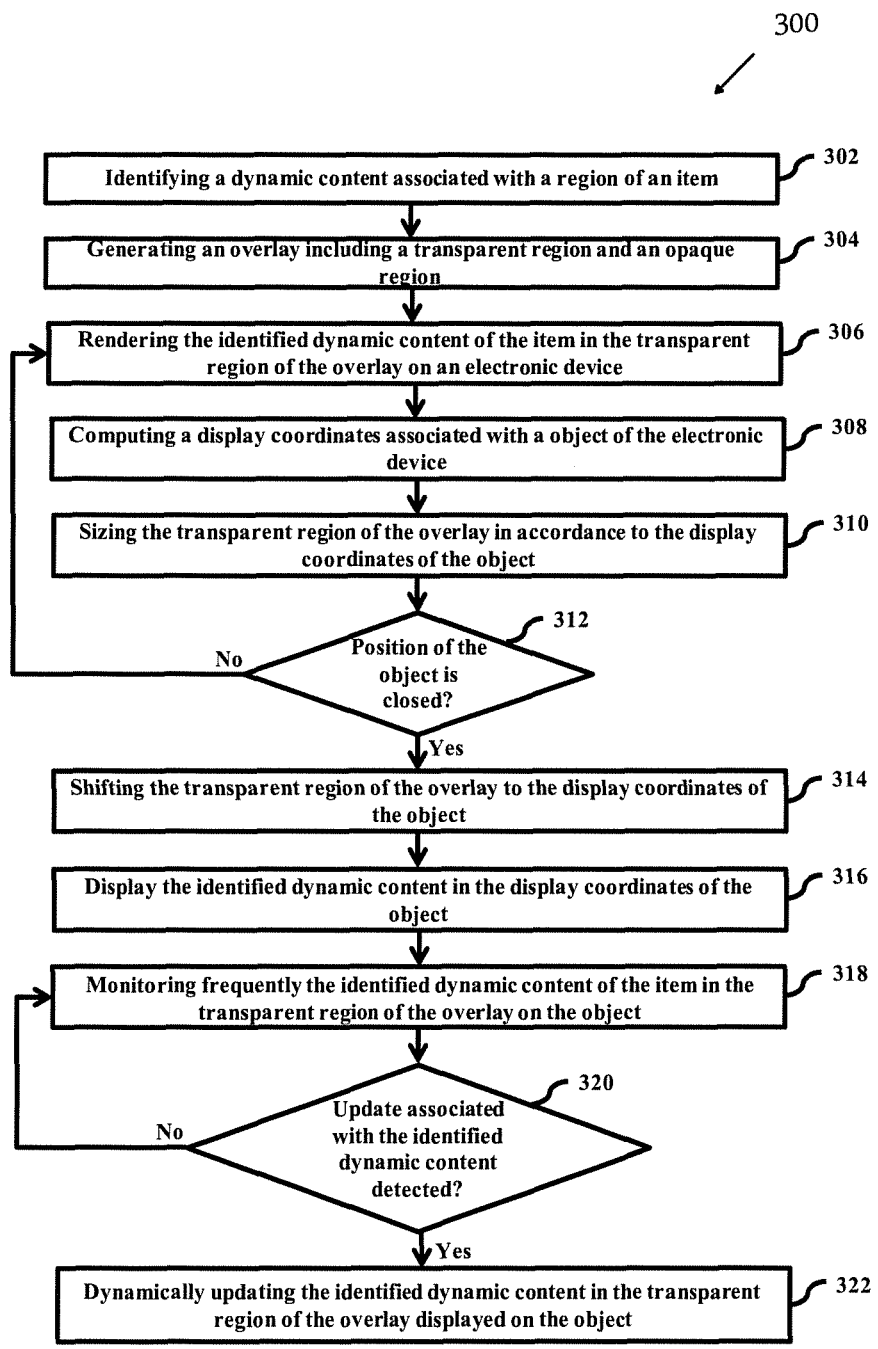
FIG. 3 is a flow diagram illustrating an example method for constantly rendering a dynamic content of an item displayed in the electronic device, according to this disclosure.

FIG. 3 is a flow diagram illustrating an example method 300 for constantly rendering a dynamic content of an item displayed in the electronic device 102, according to this disclosure. At step 302, the method 300 includes identifying the dynamic content associated with the region of the item. In an embodiment, the item is a webpage. The method 300 allows the rendering module 110 to identify the dynamic content associated with the region of the item. In an embodiment, the dynamic content associated with the region of the item is selected manually by the user of the electronic device 102 using an input means. For example, the user performs gestures on the dynamic content associated with the region of the item to select manually. In another embodiment, the dynamic content associated with the region of the item is automatically identified and selected by the rendering module 110. For example, the user manually selects the primary region of interest which is a score board region on the webpage to constantly update the user when there is a real-time update of the score. For example, the primary region of interest is the region where the stock prices get updated to constantly update the user when there is the real-time update of the stock prices. At step 304, the method 300 includes generating an overlay including the transparent region and the opaque region. In an embodiment, the opaque region is configured to black the content other than the identified dynamic content of the item displayed on the electronic device 102. In another embodiment, the opaque region is configured to transparently render content other than the identified dynamic content of the item displayed on the electronic device 102. The method 300 allows the rendering module 110 to generate the overlay including the transparent region and the opaque region. For example, the display coordinates of the transparent region are X-axis is equal to 4 cm, and Y-axis is equal to 5 cm. Unlike conventional systems, no need to create separate widgets or applications to view the dynamic content which is of user interest. At step 306, the method 300 includes rendering the identified dynamic content of the item in the transparent region of the overlay on the electronic device 102. The method 300 allows the rendering module 110 to render the identified dynamic content of the item in the transparent region of the overlay on the electronic device 102. Further, the method 300 allows the storing module 114 to store and reuse the dynamic content associated with the region of the item. Further, the method 300 allows the rendering module 110 to switch between the transparent region and a plurality of other transparent regions based on the input received from the user. For example, the region related to receiving the constant updates such as feeds, notifications associated with Social Networking Sites (SNS), email is rendered by the rendering module 110 in the transparent region of the overlay on the electronic device 102. The moment when the feed or notification update is received, the rendering module 110 will render that particular portion associated with the feed, or notification update in the see-through portion of the flip cover. The new updates associated with the Social Networking Sites (SNS), email are displayed on the see-through portion of the flip cover; thereby, minimizing the power consumption and the computation time of the browser application 104.

At step 308, the method 300 includes computing a display coordinates associated with an object of the electronic device 102. In an embodiment, the display coordinates includes aspect ratio of the object. The method 300 allows the controlling module 112 to compute the display coordinates associated with the object of the electronic device 102. For example, the display coordinates of the flip cover are X-axis is equal to 4 cm, and Y-axis is equal to 2 cm. At step 310, the method 300 includes sizing the transparent region of the overlay in accordance to the display coordinates of the object. The method 300 allows the controlling module 112 to size the transparent region of the overlay in accordance to the display coordinates of the object while retaining the aspect ratio constant. In an embodiment, the proposed method allows the user to resize the selected area of the portion of the webpage, using gesture, while retaining the window aspect ratio constant.

For example, the display coordinates of the transparent region (such as X-axis is equal to 4 cm, and Y-axis is equal to 5 cm) is sized to the display coordinates of the flip cover (such as X-axis is equal to 4 cm, and Y-axis is equal to 2 cm). At step 312, the method 300 includes determining the position of the object whether the object is in an open state or in a closed state. The method 300 allows a Hall-effect sensor (not shown) to determine the position of the object. The Hall-effect sensor sends the determined position information to the controlling module 112. If it is determined at step 312 that the position of the object is in the open state, then at step 306 the method 300 includes rendering the identified dynamic content of the item in the transparent region of the overlay on the electronic device 102. For example, the item is the webpage. When the user opens the flip cover, then the whole webpage will be rendered. In an embodiment, the webpage will be rendered back to its original state after detecting the gesture.

If it is determined at step 312 that the position of the object is in the closed state, then at step 314 the method 300 includes shifting the transparent region of the overlay to the display coordinates of the object. The method 300 allows the controlling module 112 to shift the transparent region of the overlay to the display coordinates of the object. At step 316, the method 300 includes rendering the identified dynamic content in the display coordinates of the object. The method 300 allows the controlling module 112 to display the identified dynamic content in the display coordinates of the object. Unlike conventional systems, the user receives the dynamic content updates by performing minimum number of user actions; thereby, eliminating the steps to be performed by the user such as opening the flip cover, unlocking the electronic device screen (might require a pattern/password to unlock the screen), accessing the browser to open a tab which is of interest, and scroll to the region of the webpage that is of interest.

At step 318, the method 300 includes monitoring frequently the identified dynamic content of the item in the transparent region of the overlay on the object. The method 300 allows the controlling module 112 to monitor frequently the identified dynamic content of the item in the transparent region of the overlay on the object. At step 320, the method 300 includes determining whether an update associated with the identified dynamic content of the item is detected in the transparent region of the overlay on the object. The method 300 allows the controlling module 112 to detect any update associated with the identified dynamic content. If it is determined at step 320 that the update associated with the identified dynamic content of the item is not detected, then at step 318, the method 300 includes monitoring frequently the identified dynamic content of the item in the transparent region of the overlay on the object.

If it is determined at step 320 that the update associated with the identified dynamic content of the item is detected, then at step 322, the method 300 includes dynamically updating the identified dynamic content in the transparent region of the overlay displayed on the object. The method 300 allows the controlling module 112 to dynamically update the identified dynamic content in the transparent region of the overlay displayed on the object.

The various actions, acts, blocks, steps, and the like in method 300 is performed in the order presented, in a different order or simultaneously. Further, in some embodiments, some actions, acts, blocks, steps, and the like is omitted, added, modified, skipped, and the like without departing from the scope of the disclosure.

Figure 4:
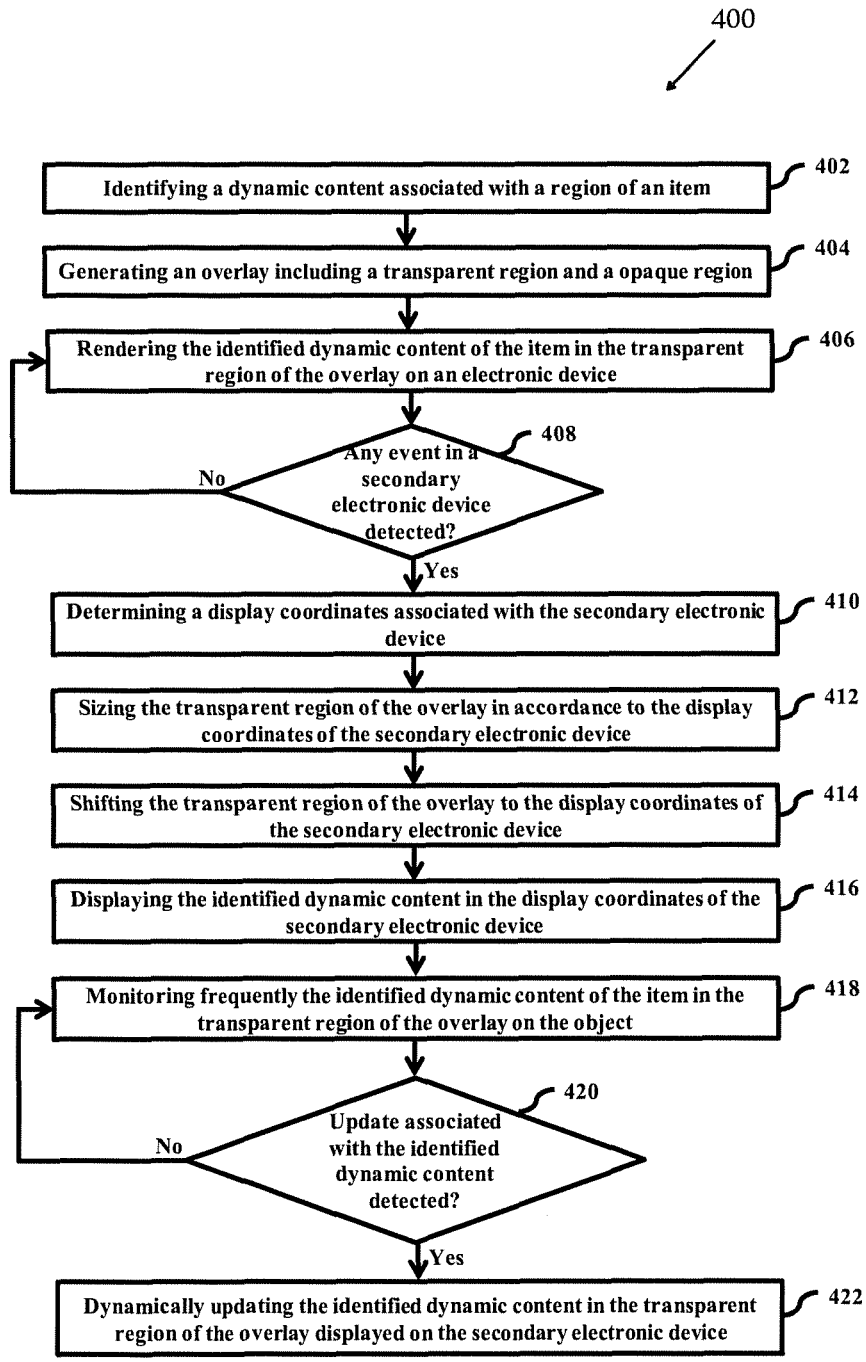
FIG. 4 is a flow diagram illustrating an example method for constantly rendering the dynamic content of an item on a secondary electronic device, according to this disclosure.

FIG. 4 is a flow diagram illustrating an example method 400 for constantly rendering a dynamic content of an item on a secondary electronic device, according to this disclosure. At step 402, the method 400 includes identifying the dynamic content associated with the region of the item. In an embodiment, the item is a webpage. The method 400 allows the rendering module 110 to identify the dynamic content associated with the region of the item. In an embodiment, the dynamic content associated with the region of the item is selected manually by the user. In another embodiment, the dynamic content associated with the region of the item is automatically selected by the rendering module 110. For example, the user manually selects the primary region of interest which is the scoreboard region on the webpage to constantly update the user when there is the real-time update of the score associated with the Kenya innings. For example, the primary region of interest is the region where the stock prices get updated to constantly update the user when there is the real-time update of the stock prices. At step 404, the method 400 includes generating an overlay including a transparent region and an opaque region. In an embodiment, the opaque region is configured to black content other than the identified dynamic content of the item displayed on the electronic device 102. In another embodiment, the opaque region is configured to transparently render content other than the identified dynamic content of the item displayed on the electronic device 102. The method 400 allows the rendering module 110 to generate the overlay including the transparent region and the opaque region. For example, the display coordinates of the transparent region are X-axis is equal to 4 cm, and Y-axis is equal to 5 cm. Unlike conventional systems, no need to create separate widgets or applications to view the dynamic content which is of user interest. At step 406, the method 400 includes rendering the identified dynamic content of the item in the transparent region of the overlay on the electronic device 102. The method 400 allows the rendering module 110 to render the identified dynamic content of the item in the transparent region of the overlay on the electronic device 102. For example, the user selected region related to receiving the constant updates such as feeds, notifications associated with Social Networking Sites (SNS), email are rendered by the rendering module 110 in the transparent region of the overlay on the electronic device 102. The moment when the feed or notification update is received, the rendering module 110 will render that particular portion associated with the feed, or notification update on the screen of the secondary electronic device.

At step 408, the method 400 includes detecting any event in a secondary electronic device. In an embodiment, the event described herein can be, for example and not limited to, a swipe gesture, a slide gesture, a tap gesture, a voice gesture, a hover gesture, hand shaking gesture, and the like. The method 400 allows the controlling module 112 to detect any event in the secondary electronic device. If it is determined at step 408 that any event in the secondary electronic device is not detected, then at step 406, the method 400 includes rendering the identified dynamic content of the item in the transparent region of the overlay on the electronic device 102.

If it is determined at step 408 that any event in the secondary electronic device is detected, then at step 410, the method 400 includes determining the display coordinates associated with the secondary electronic device. For example, the display coordinates of the secondary electronic device (such as watch) are X-axis is equal to 2 cm, and Y-axis is equal to 2 cm. In another example, the display coordinates of the secondary electronic device (such as washing machine) are X-axis is equal to 4 cm, and Y-axis is equal to 5 cm. The method 400 allows the controlling module 112 to determine the display coordinates associated with the secondary electronic device. At step 412, the method 400 includes sizing the transparent region of the overlay in accordance to the display coordinates of the secondary electronic device. The method 400 allows the controlling module 112 to size the transparent region of the overlay in accordance to the display coordinates of the secondary electronic device. For example, the display coordinates of the transparent region (such as X-axis is equal to 4 cm, and Y-axis is equal to 5 cm) is sized to the display coordinates of the watch (such as X-axis is equal to 2 cm, and Y-axis is equal to 2 cm). In another example, the display coordinates of the transparent region (such as X-axis is equal to 4 cm, and Y-axis is equal to 5 cm) is sized to the display coordinates of the washing machine (such as X-axis is equal to 4 cm, and Y-axis is equal to 5 cm).

At step 414, the method 400 includes shifting the transparent region of the overlay to the display coordinates of the secondary electronic device. The method 400 allows the controlling module 112 to shift the transparent region of the overlay to the display coordinates of the secondary electronic device. At step 416, the method 400 includes rendering the identified dynamic content in the display coordinates of the secondary electronic device. The method 400 allows the controlling module 112 to display the identified dynamic content in the display coordinates of the secondary electronic device. For example, consider a scenario that the user cannot be able to access his/her phone for 2 hours (such as while travelling) but the user wants to receive dynamic updates related to the user selected region on the webpage. In an embodiment, the user pre-configures the settings in the electronic device 102 to constantly display the dynamic content updates on the wearable device (such as watch) screen as the user easily accesses the wearable device while travelling. In another embodiment, the dynamic content updates are displayed on the wearable device screen in response to determining any touch gesture event by the user on the wearable device. In another example, if the user is driving a car then it is inconvenient to access his/her phone to view the dynamic contents in regular intervals as it includes distraction of his/her eye site and leads to accidents. The user pre-configures the settings in his/her phone or performs the tap gesture on the dashboard of the car to display the dynamic content updates of the user selected region on the webpage at regular intervals which are received from the phone. In another example, consider a scenario that the user cannot access his/her phone for 1 hour when the user is washing his/her clothes in the washing machine. Further, while washing the clothes the user wants to receive dynamic updates on the display coordinates of the washing machine screen related to the user selected region on the webpage. In an embodiment, the user pre-configures the settings in the electronic device 102 to constantly display the dynamic content updates on the washing machine screen as the user easily views the displayed content. In another embodiment, the dynamic content updates are displayed on the washing machine screen in response to determining any touch event by the user on the screen of the washing machine.

At step 418, the method 400 includes monitoring frequently the identified dynamic content of the item in the transparent region of the overlay on the object. The method 400 allows the controlling module 112 to monitor frequently the identified dynamic content of the item in the transparent region of the overlay on the object. At step 420, the method 400 includes determining whether any update associated with the identified dynamic content of the item is detected in the transparent region of the overlay on the object. The method 400 allows the controlling module 112 to detect any update associated with the identified dynamic content of the item in the transparent region of the overlay on the object. If it is determined at step 420 that the update associated with the identified dynamic content of the item is not detected, then at step 418, the method 400 includes monitoring frequently the identified dynamic content of the item in the transparent region of the overlay on the object.

If it is determined at step 420 that the update associated with the identified dynamic content is detected, then at step 422, the method 400 includes dynamically updating the identified dynamic content in the transparent region of the overlay displayed on the secondary electronic device. The method 400 allows the controlling module 112 to dynamically update the identified dynamic content in the transparent region of the overlay displayed on the object. Unlike conventional systems, the user is provided with the real-time dynamic content updates on the secondary electronic device (For example: wearable device, Television, Dashboard of a vehicle, infotainment system in the vehicle, consumer electronic device (such as washing machine), and the like) which is in sync with the electronic device (For example: a Smart phone, a Personal Digital Assistant (PDA), a tablet, a phablet, and the like) irrespective of the electronic device state (such as whether the electronic device is in locked state or the screen is closed with the flip cover of the electronic device).

The various actions, acts, blocks, steps, and the like in method 400 is performed in the order presented, in a different order or simultaneously. Further, in some embodiments, some actions, acts, blocks, steps, and the like may be omitted, added, modified, skipped, and the like without departing from the scope of the disclosure.

Figure 5A:
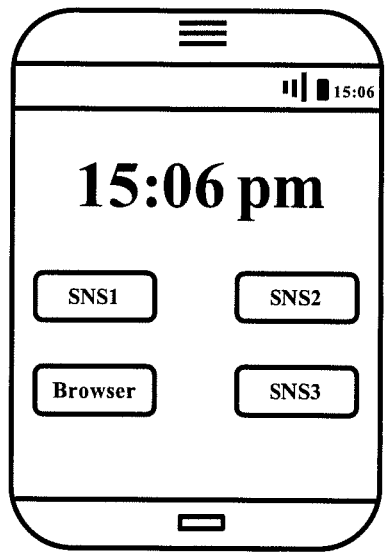
FIGS. 5A-5F shows example illustrations for selecting and rendering a specific region of a webpage displayed in a see-through portion of a flip-cover associated with an electronic device, according to this disclosure.
Figure 5B:
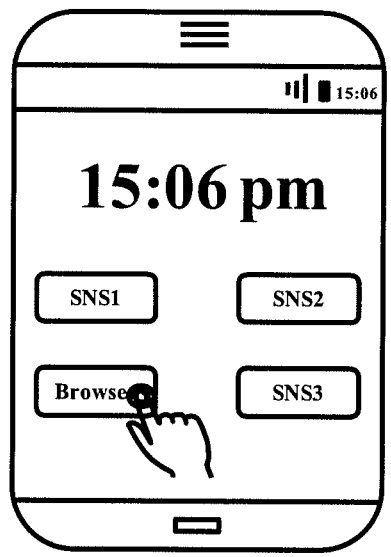
Figure 5B:
Figure 5D:
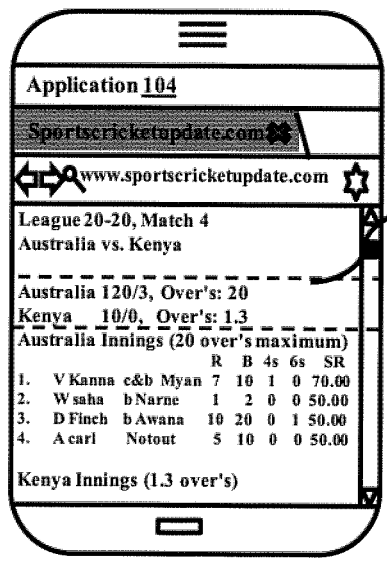
Figure 5C:
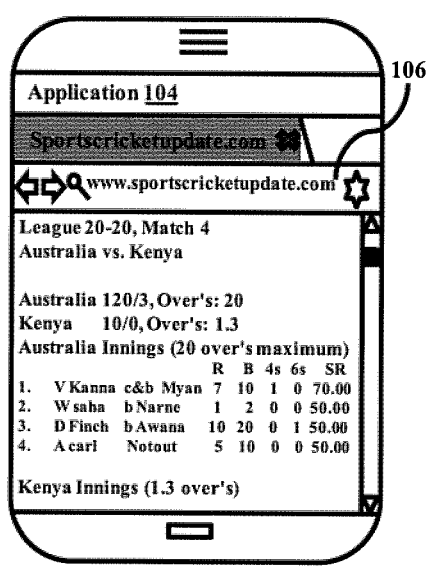

FIGS. 5A, 5B, 5C, 5D, 5E, and 5F shows example illustrations for selecting and rendering a specific region of a webpage to be displayed on a see-through portion of a flip cover 504 associated with an electronic device 102, according to this disclosure. The FIG. 5A shows an electronic device 102 with SNS 1, SNS 2, browser, and SNS 3 applications. The user accesses the browser application 104 by performing a tap gesture on the browser application icon as show in the FIG. 5B. The user enters the "www.sports-cricketupdate.com" URL in the address bar 106 of the browser application 104 on the electronic device 102 to view the live cricket updates of Australia vs. Kenya league match as shown in the FIG. 5C. The user selects the region 502 manually which is dynamically changing whenever the score of Kenya is updated as shown in the FIG. 5D. In an embodiment, the dynamically changing region 502 is selected automatically by the rendering module 110 as shown in the FIG. 5D. In another embodiment, the dynamically changing region 502 is selected manually by the user performing the gesture on the region.

Figures 5E, 5F:
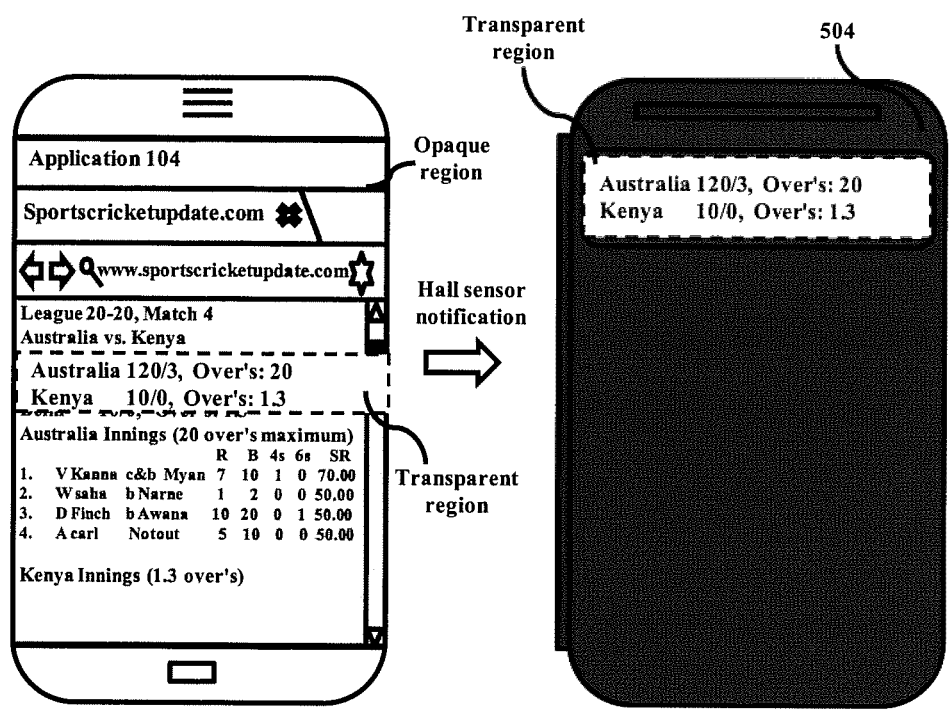

The FIG. 5E shows the overlay including the transparent region and the opaque region. The transparent region includes the dynamically changing region associated with the webpage. The opaque region transparently renders the content on the webpage other than the identified dynamic content of the item in the transparent region displayed on the electronic device 102 as shown in the FIG. 5E. The transparent region of the overlay is sized in accordance to the see-through portion of the flip cover 504 as shown in the FIG. 5F. In an embodiment, user closes the browser application from the see-through portion of the flip cover 504. The transparent region including the identified dynamic content of the overlay is shifted to the see-through portion of the flip cover 504 for rendering the dynamic content to the user after determining that the flip cover 504 is in the closed state as shown in the FIG. 5F. The position of the flip cover 504 is determined by the Hall-Effect sensor (not shown). For example, if the user desires to view the identified dynamic content in the screen of the electronic device, user sees content even if flip cover is closed. The proposed method dynamically resizes the display coordinates of the transparent region to that of the screen of the electronic device. In an embodiment, the proposed method allows the user to resize the selected area of the portion of the webpage, using gesture, while retaining the window aspect ratio constant.

Figure 6A:
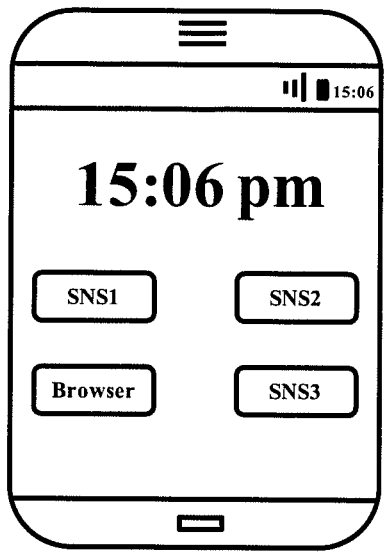
FIGS. 6A-6F show example illustrations for selecting and rendering a specific region of a webpage displayed in a see-through portion of a flip cover associated with an electronic device, according to this disclosure.
Figure 6B:
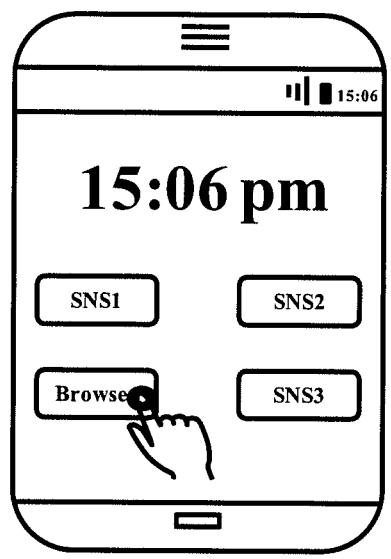
Figure 6D:
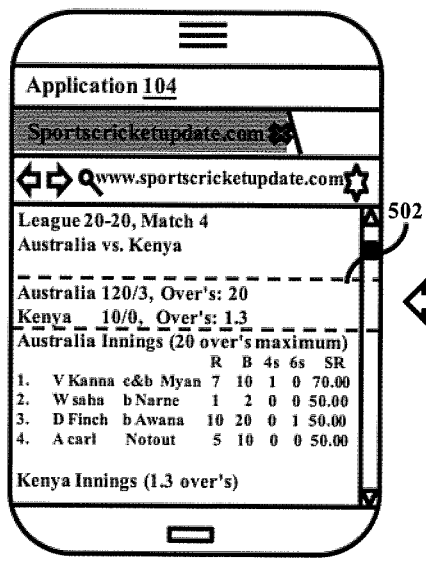
Figure 6C:
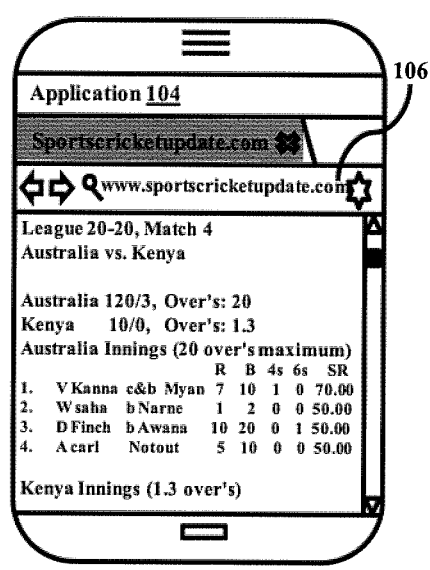

FIGS. 6A, 6B, 6C, 6D, 6E, and 6F show example illustrations for selecting and rendering a specific region of a webpage displayed in a see-through portion of a flip cover 504 associated with an electronic device 102, according to this disclosure. The FIG. 6A shows an electronic device 102 with SNS 1, SNS 2, browser, and SNS 3 applications. The user accesses the browser application 104 by performing a tap gesture on the browser application icon as show in the FIG. 6B. The user enters the "www.sports-cricketupdate.com" URL in the address bar 106 of the browser application 104 on the electronic device 102 to view the live cricket updates of Australia vs. Kenya league match as shown in the FIG. 6C. The user selects the region 502 manually which is dynamically changing whenever the score of Kenya is updated as shown in the FIG. 6D. In an embodiment, the dynamically changing region is selected automatically by the rendering module 110.

Figures 6E, 6F:
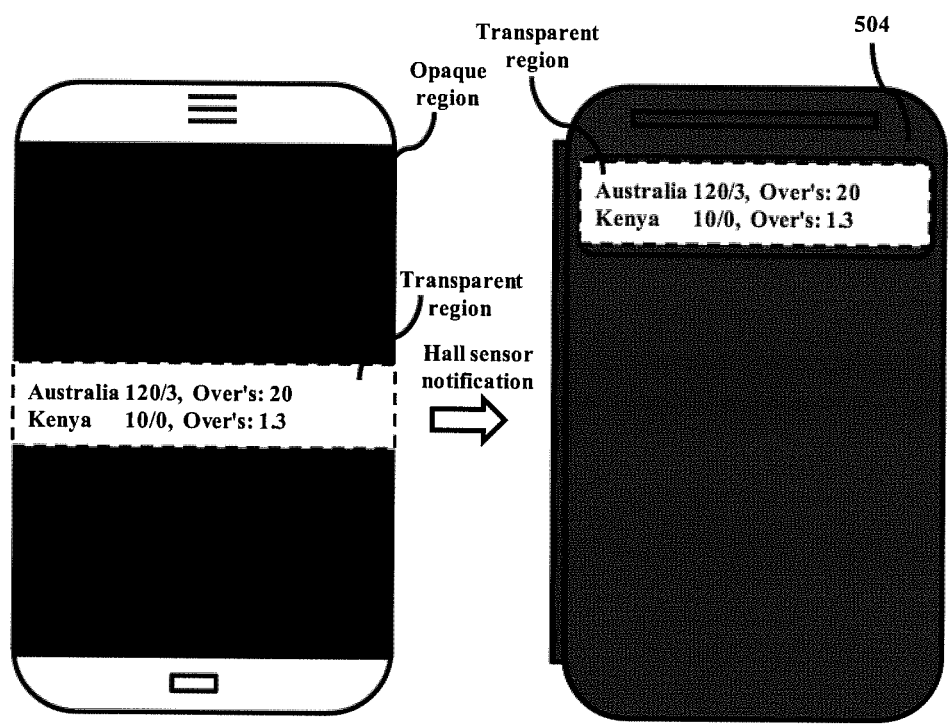

The FIG. 6E shows the overlay including the transparent region and the opaque region. The transparent region includes the dynamically changing content associated with the webpage. The opaque region is configured to black the content other than the identified dynamic content of the item displayed on the electronic device 102 as shown in the FIG. 6E. The transparent region of the overlay is sized in accordance to the see-through portion of the flip cover 504 as shown in the FIG. 6F. The transparent region including the identified dynamic content of the overlay is shifted to the see-through portion of the flip cover 504 for rendering the dynamic content to the user after determining that the flip cover 504 is in the closed state as shown in the FIG. 6F. The position of the flip cover 504 is determined by the Hall-Effect sensor (not shown). Further, the transparent region including the identified dynamic content of the overlay is shifted back to the electronic device screen for rendering the dynamic content to the user after changing the position of the flip cover from the closed state to the open state by the user.

Figure 7A:
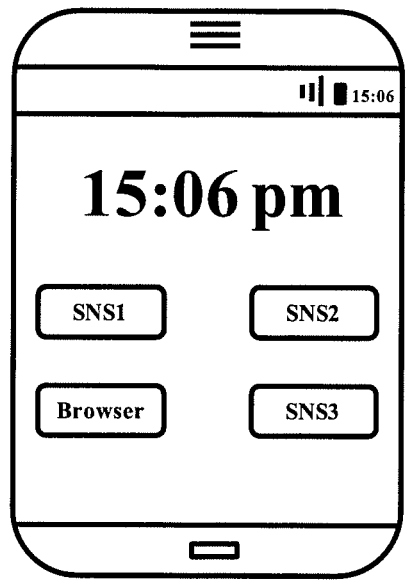
Figure 7B:
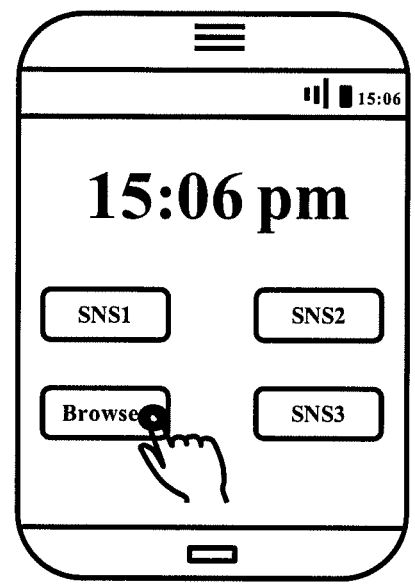
Figure 7D:
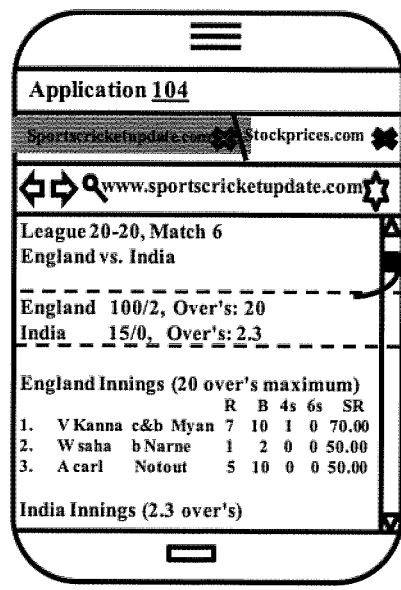
Figure 7C:
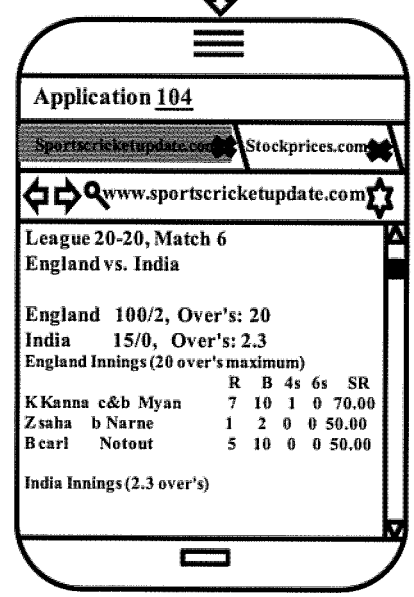

FIGS. 7A, 7B, 7C, 7D, 7E, 7F, 7G, and 7H show example illustrations for selecting multiple regions and rendering the multiple regions of a webpage displayed in a see-through portion of a flip cover 504 associated with an electronic device 102, according to this disclosure. The FIG. 7A shows an electronic device 102 with SNS 1, SNS 2, browser, and SNS 3 applications. The user accesses the browser application 104 by performing a tap gesture on the browser application icon as show in the FIG. 7B. The user enters the "www.sports-cricketupdate.com" URL in the address bar 106 of the browser application 104 on the electronic device 102 to view the live cricket updates of England vs. India league match in one tab and the user enters the "www.stockprice.com" URL in the address bar 106 of the browser application 104 on the electronic device 102 to view the live share market updates in the another tab as shown in the FIG. 7C and the FIG. 7e. The user selects the region 502 manually which is dynamically changing whenever the score of India is updated as shown in the FIG. 7D. In an embodiment, the dynamically changing region is selected automatically by the rendering module 110.

The user selects the region 702 manually which is dynamically changing whenever the value of the stock prices is updated as shown in the FIG. 7F. In an embodiment, user selects multiple portions of interest corresponding to different tabs in the browser. The multiple selected portions in the different tabs are projected on the see-through portion of the flip cover 504. Initially, the transparent region including the dynamic content related to live cricket score is displayed to the user as shown in the FIG. 7G. In an embodiment, the proposed method renders selected portions from different web-pages, in a single browser tab. By performing the gesture 704 on the see-through portion of the flip cover 504, the dynamic content related to stock prices is displayed to the user as shown in the FIG. 7G. In this way, the multiple selected regions pertaining to different webpages or the same page are displayed to the user in see-through portion of the flip cover 504 on the electronic device 102.

In an embodiment, the multiple selected regions of the same webpage or different webpages are displayed on the secondary electronic device. Also, the multiple selected regions are flipped by performing the gesture on the secondary electronic device screen by the user.

Figure 8A:
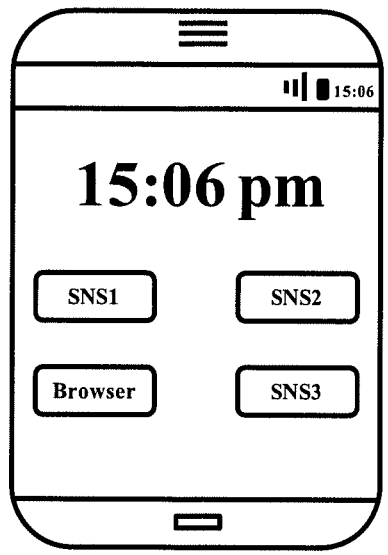
Figure 8B:
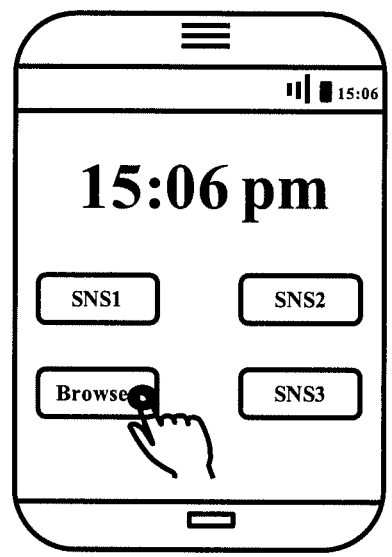
Figure 8D:
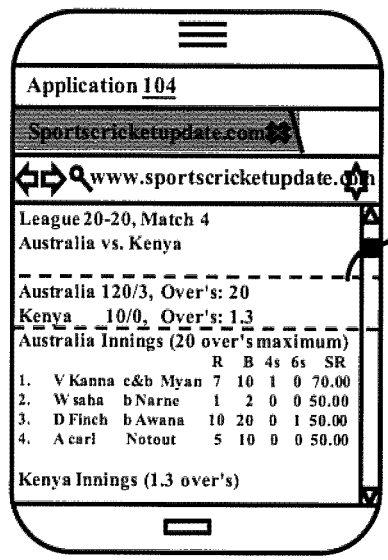
Figure 8C:
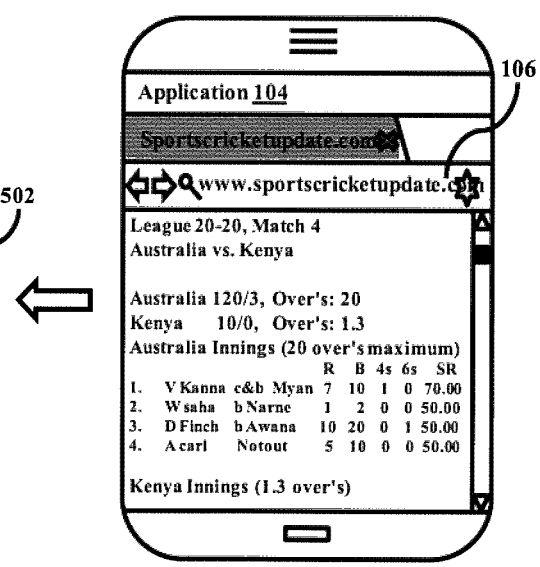

FIGS. 8A, 8B, 8C, 8D, and 8E show example illustrations for selecting and rendering a specific region of a webpage displayed in a secondary electronic device, according to this disclosure. The FIG. 8A shows an electronic device 102 with SNS 1, SNS 2, browser, and SNS 3 applications. The user accesses the browser application 104 by performing a tap gesture on the browser application icon as show in the FIG. 8B. The user enters the "www.sports-cricketupdate.com" URL in the address bar 106 of the browser application 104 on the electronic device 102 to view the live cricket updates of Australia vs. Kenya league match as shown in the FIG. 8C. The user selects the region 502 manually which is dynamically changing whenever the score of Kenya is updated as shown in the FIG. 8D. In an embodiment, the dynamically changing region is selected automatically by the rendering module 110.

The FIG. 8E shows the overlay including the transparent region and the opaque region. The transparent region includes the dynamically changing content associated with the webpage. The opaque region is configured to black the content other than the identified dynamic content of the item displayed on the electronic device 102 as shown in the FIG. 8E. The transparent region of the overlay is sized in accordance to the display portion of the wearable device (such as a watch) as shown in the FIG. 8F in response to determining any gesture on the wearable device by the user. The transparent region including the identified dynamic content of the overlay is shifted to the display portion of the wearable device (such as a watch) for rendering the dynamic content to the user as shown in the FIG. 8F. For example, the transparent region of the overlay is sized in accordance to the display portion of the consumer electronic device (such as a washing machine) after detecting the gesture on the washing machine by the user. The transparent region including the identified dynamic content of the overlay is shifted to the display portion of the washing machine for rendering the dynamic content to the user. The position of the flip cover 504 is determined by the Hall-Effect sensor.

Figure 9:
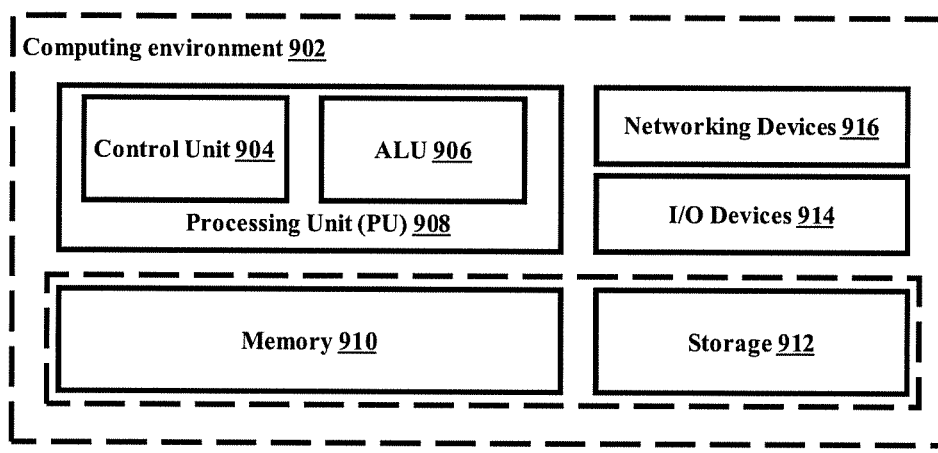
FIG. 9 illustrates a computing environment implementing the method and system for constantly rendering a dynamic content of an item displayed in an electronic device, according to this disclosure.

FIG. 9 illustrates an example computing environment implementing the method and system for constantly rendering a dynamic content of an item displayed in an electronic device 102, according to this disclosure. As depicted in FIG. 9, the computing environment 901 comprises at least one processing unit 904 that is equipped with a control unit 902 and an Arithmetic Logic Unit (ALU) 903, a memory 905, a storage unit 906, plurality of networking devices 908 and a plurality Input output (I/O) devices 907. The processing unit 904 is responsible for processing the instructions of the algorithm. The processing unit 904 receives commands from the control unit in order to perform its processing. Further, any logical and arithmetic operations involved in the execution of the instructions are computed with the help of the ALU 903.

The overall computing environment 901 is composed of multiple homogeneous and/or heterogeneous cores, multiple CPUs of different kinds, special media and other accelerators. The processing unit 904 is responsible for processing the instructions of the algorithm. Further, the plurality of processing units 904 are located on a single chip or over multiple chips.

The algorithm comprising of instructions and codes required for the implementation are stored in either the memory unit 905 or the storage 906 or both. At the time of execution, the instructions is fetched from the corresponding memory 905 and/or storage 906, and executed by the processing unit 904.

In case of any hardware implementations various networking devices 908 or external I/O devices 907 are connected to the computing environment to support the implementation through the networking unit and the I/O device unit.

The embodiments disclosed herein are implemented through at least one software program running on at least one hardware device and performing network management functions to control the elements. The elements shown in FIGS. 1, 2 and 9 include blocks which are at least one of a hardware device, or a combination of hardware device and software module.

The foregoing description of the specific embodiments will so fully reveal the general nature of the embodiments herein that others, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein are practiced with modification within the spirit and scope of the embodiments as described herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for constantly rendering at least one dynamic content of at least one item displayed in an electronic device, the method comprising:
   identifying the at least one dynamic content associated with at least one region of said at least one item;
   generating an overlay, on a screen of the electronic device, including a transparent region and an opaque region, and rendering the at least one identified dynamic content, wherein the transparent region overlaps the at least one identified dynamic content and the opaque region overlaps content other than the identified at least one dynamic content; and
   displaying, in response to an event related to an electronic device cover, the at least one rendered dynamic content of the transparent region by moving the at least one rendered dynamic content to display coordinates, of the screen, corresponding to a see-through portion of the electronic device cover,
   wherein generating the overlay including the transparent region and the opaque region comprises:
   computing display coordinates associated with the see-through portion of the electronic device cover, wherein the display coordinates comprise an aspect ratio of the see-through portion of the electronic device cover; and adjusting the transparent region of the overlay in accordance to the display coordinates of the see-through portion of the electronic device cover, wherein the transparent region is adjusted to adaptively display the at least one identified dynamic content of the at least one item at the display coordinates of the see-through portion of the electronic device cover while retaining an aspect ratio constant.

2. The method of claim 1, wherein the item is at least one of a webpage, a portion of the webpage, a display window, an undisplayed portion of the webpage, a window within the webpage, and an application.

3. The method of claim 1, wherein the opaque region is configured to black content other than the at least one identified dynamic content of the at least one item displayed on the electronic device.

4. The method of claim 1, wherein the opaque region is configured to transparently render content other than the at least one identified dynamic content of the at least one item displayed on the electronic device.

5. The method of claim 1, wherein the displaying, in response to the event related to the electronic device cover, the at least one rendered dynamic content of the transparent region by moving to display coordinates, of the screen, corresponding to the see-through portion of the electronic device cover comprises:
   determining a position of the electronic device cover coupled to the electronic device, wherein the position is one of an open position and a closed position; and
   shifting the transparent region of the overlay to the display coordinates of the electronic device cover in response to determining that the electronic device cover is in the closed position.

6. The method of claim 1, wherein the at least one item is selected by a user of the electronic device using an input means.

7. The method of claim 1, wherein the at least one item is identified and selected automatically by the electronic device.

8. The method of claim 1, wherein the method further comprises:
   identifying another event in a secondary electronic device;
   determining display coordinates associated with the secondary electronic device in response to identifying the other event; and
   rendering the at least one identified dynamic content of the at least one item in the transparent region of the overlay on a screen of the secondary electronic device, wherein the transparent region is adjusted in accordance to the display coordinates associated with the secondary electronic device.

9. The method of claim 1, wherein the method further comprises:
   storing and reusing the at least dynamic content associated with the at least one item; and
   switching between the transparent region and a plurality of other transparent regions based on an input received from a user.

10. The method of claim 1, wherein the method further comprises:
    monitoring the at least one identified dynamic content of the at least one item in the transparent region of the overlay;
    determining whether an update is associated with the at least one identified dynamic content based on the monitoring; and
    dynamically updating the at least one identified dynamic content in the transparent region of the overlay in response to determining that the update is associated with the at least one identified dynamic content.

11. An electronic device for constantly rendering at least one dynamic content of at least one item displayed in the electronic device, the electronic device comprising:
    an integrated circuit further comprising at least one processor;
    at least one memory having a computer program code within the integrated circuit;
    the at least one memory and the computer program code with the at least one processor cause the electronic device to:
      identify the at least one dynamic content associated with at least one region of the at least one item,
      generate an overlay, on a screen of the electronic device, including a transparent region and an opaque region, and rendering the at least one identified dynamic content, wherein the transparent region overlaps the at least one identified dynamic content and the opaque region overlaps content other than the identified at least one dynamic content,
      compute display coordinates associated with a see-through portion of an electronic device cover, wherein the display coordinates comprise an aspect ratio of the see-through portion of the electronic device cover; and
      adjust the transparent region of the overlay in accordance to the display coordinates of the see-through portion of the electronic device cover, wherein the transparent region is adjusted to adaptively display the at least one identified dynamic content of the at least one item in the display coordinates of at least one see-through portion of the electronic device cover while retaining an aspect ratio constant, and
      display, in response to an event related to the electronic device cover, the at least one rendered dynamic content of the transparent region by moving the at least one rendered dynamic content to display coordinates, of the screen, corresponding to the at least one see-through portion of the electronic device cover.

12. The electronic device of claim 11, wherein the item is at least one of a webpage, a portion of the webpage, a display window, an undisplayed portion of the webpage, a window within the webpage, and an application.

13. The electronic device of claim 11, wherein the opaque region is configured to black content other than the at least one identified dynamic content of the at least one item displayed on the electronic device.

14. The electronic device of claim 11, wherein the opaque region is configured to transparently render content other than the at least one identified dynamic content of the at least one item displayed on the electronic device.

15. The electronic device of claim 11, wherein the electronic device is further configured to:
    determine a position of the electronic device cover coupled to the electronic device, wherein the position is one of an open position and a closed position; and
    shift the transparent region of the overlay to the display coordinates of the electronic device cover in response to determining that the electronic device cover is in the closed position.

16. The electronic device of claim 11, wherein the at least one item is selected by a user of the electronic device using an input means.

17. The electronic device of claim 11, wherein the at least one item is identified and selected automatically by the electronic device.

18. The electronic device of claim 11, wherein the electronic device further comprises:
identify another event in a secondary electronic device;
determine display coordinates associated with the secondary electronic device in response to identifying the other event; and
render the at least one identified dynamic content of the at least one item in the transparent region of the overlay on a screen of the secondary electronic device, wherein the transparent region is adjusted in accordance to the display coordinates associated with the secondary electronic device.

19. The electronic device of claim 11, wherein the electronic device is further configured to:
store and reuse the at least dynamic content associated with the at least one item; and
switch between the transparent region and a plurality of other transparent regions based on an input received from a user.

20. The electronic device of claim 11, wherein the electronic device is further configured to:
monitor the at least one identified dynamic content of the at least one item in the transparent region of the overlay;
determine whether an update is associated with the at least one identified dynamic content based on the monitoring; and
update the at least one identified dynamic content in the transparent region of the overlay in response to determining that the update is associated with the at least one identified dynamic content.

* * * * *